(12) United States Patent
Petrovic et al.

(10) Patent No.: US 10,353,518 B2
(45) Date of Patent: Jul. 16, 2019

(54) TOUCH CONTROLLER WITH SIGNAL COMBINING AND SIMULTANEOUS I/Q DEMODULATION

(71) Applicant: SYNAPTICS INCORPORATED, San Jose, CA (US)

(72) Inventors: Vladan Petrovic, San Jose, CA (US); David Sobel, Los Altos, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 176 days.

(21) Appl. No.: 15/294,672

(22) Filed: Oct. 14, 2016

(65) Prior Publication Data

US 2018/0107335 A1   Apr. 19, 2018

(51) Int. Cl.
*G06F 3/041*   (2006.01)
*G06F 3/044*   (2006.01)

(52) U.S. Cl.
CPC ............ *G06F 3/0418* (2013.01); *G06F 3/044* (2013.01); *G06F 2203/04105* (2013.01)

(58) Field of Classification Search
CPC ...... G06F 3/038; G06F 3/0383; G06F 3/0416; G06F 3/044; G06F 3/03545; G06F 2203/04104; G06F 2203/04107; G06F 3/0418; G06F 2203/04105
See application file for complete search history.

(56) References Cited

U.S. PATENT DOCUMENTS

| | | | |
|---|---|---|---|
| 3,699,462 A * | 10/1972 | Kietzer | H03D 1/2245 327/255 |
| 7,480,348 B2 | 1/2009 | Nakano | |
| 7,880,481 B2 | 2/2011 | Zangl et al. | |
| 7,944,216 B2 | 5/2011 | Brasseur et al. | |
| 8,352,202 B2 | 1/2013 | Hargreaves | |
| 8,625,564 B2 * | 1/2014 | Kawasaki | H04M 1/7253 370/339 |
| 8,730,204 B2 | 5/2014 | Washburn et al. | |
| 9,092,086 B2 | 7/2015 | Krah et al. | |
| 9,372,581 B2 | 6/2016 | Cattivelli et al. | |
| 9,389,742 B2 | 7/2016 | Crandall et al. | |
| 9,430,087 B2 | 8/2016 | Krah et al. | |
| 2009/0309851 A1 * | 12/2009 | Bernstein | G06F 3/0416 345/174 |
| 2011/0063993 A1 * | 3/2011 | Wilson | G06F 3/044 370/254 |
| 2012/0013546 A1 * | 1/2012 | Westhues | G06F 3/044 345/173 |
| 2013/0201151 A1 * | 8/2013 | Takashima | G06F 3/044 345/174 |
| 2015/0130733 A1 * | 5/2015 | Chang | G06F 3/0416 345/173 |
| 2016/0179243 A1 | 6/2016 | Schwartz | |
| 2017/0123523 A1 * | 5/2017 | Huang | G06F 3/041 |

\* cited by examiner

*Primary Examiner* — Bryan Earles

(74) *Attorney, Agent, or Firm* — Paradice and Li LLP

(57) ABSTRACT

An input device is configured to detect signals from of an input object. Examples include acquiring a first signal on a first sensor electrode of the input device; acquiring a second signal on a second sensor electrode of the input device; combining the first signal and the second signal to produce a combined signal; demodulating the combined signal to determine an in-phase component of the combined signal and a quadrature component of the combined signal; and combining the in-phase component and the quadrature component to determine signal magnitude information.

19 Claims, 10 Drawing Sheets

TOUCH CONTROLLER WITH SIGNAL COMBINING AND SIMULTANEOUS I/Q DEMODULATION

BACKGROUND

Field of the Disclosure

Aspects of this disclosure generally relate to sensing of signals capacitively coupled into a touch sensor and, more particularly, signal combining for simultaneous I/Q (in-phase quadrature) demodulation of capacitively coupled signals with an unknown phase.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some proximity sensor devices demodulate sensor signals using single phase demodulation. However, one problem is that for reception of sensor signals having an unknown phase, single phase demodulation can result in varying output magnitude and inconsistent magnitude and phase measurements.

Thus, there is a need for an improved input device that enables sensing of signals with an unknown phase.

SUMMARY

This disclosure generally provides input devices, processing systems, and methods for touch sensing using signal combining for simultaneous in-phase quadrature (I/Q) demodulation.

Examples of the present disclosure provide a processing system for an input device. In one example, a processing system includes sensor circuitry configured to: acquire a first signal on a first sensor electrode of the input device; and acquire a second signal on a second sensor of the input device; signal combining circuitry configured to: combine the first signal and the second signal to produce a combined signal; and a processing module, coupled to the signal combining circuitry, configured to: demodulate the combined signal to determine an in-phase component of the combined signal and a quadrature component of the combined signal; and combine the in-phase component and the quadrature component to determine signal magnitude information.

Other examples of the present disclosure provide an input device. In one example, an input device includes an input surface; a first sensor electrode; a second sensor electrode; and a processing system coupled to the first sensor electrode and the second sensor electrode, the processing system configured to: acquire a first signal on a first sensor electrode of the input device; acquire a second signal on a second sensor electrode of the input device; combine the first signal and the second signal to produce a combined signal; demodulate the combined signal to determine an in-phase component and a quadrature component of the combined signal; and combine the in-phase component and the quadrature component to determine signal magnitude information.

Other examples of the present disclosure provide a method of operating an input device. In one example, a method includes acquiring a first signal on a first sensor electrode of the input device; acquiring a second signal on a second sensor electrode of the input device; combining the first signal and the second signal to produce a combined signal; demodulating the combined signal to determine an in-phase component of the combined signal and a quadrature component of the combined signal; and combining the in-phase component and the quadrature component to determine signal magnitude information.

BRIEF DESCRIPTION OF THE DRAWINGS

So that the manner in which the above recited features of the present disclosure can be understood in detail, a more particular description of the disclosure, briefly summarized above, may be had by reference to examples, some of which are illustrated in the appended drawings. It is to be noted, however, that the appended drawings illustrate only typical examples of this disclosure and are therefore not to be considered limiting of its scope, for the disclosure may admit to other equally effective examples.

Figure 1:
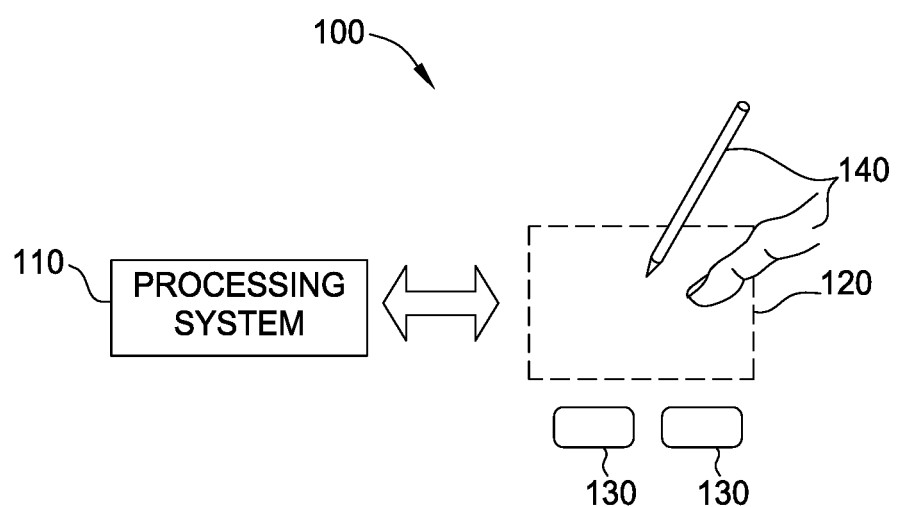
FIG. 1 is a block diagram of an exemplary input device.

To facilitate understanding, identical reference numerals have been used, where possible, to designate identical elements that are common to the figures. It is contemplated that elements disclosed in one example may be beneficially utilized on other examples without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various examples of the present disclosure provide input devices, processing systems and methods for signal combining for simultaneous in-phase quadrature (I/Q) demodulation, for example, of signals having unknown phase. As utilized herein, capacitive sensing is described as a touch sensing technique utilizing information received from capacitive sensor electrodes at least some of which may be combination electrodes, while force sensing is described as utilizing information received from force sensor electrodes to determine force that an input object exerts against the input device.

Some input devices may be configured for touch sensing. Touch sensing may be performed by driving one or multiple sensor electrodes of the input device with a modulating signal and receiving resulting signals having effects indicating changes in capacitance of the sensor electrodes. The changes in capacitance can be used to determine a position of an input object. Typically, touch controllers demodulate the signal(s) from the sensor electrodes using single phase demodulation. Single phase demodulation may be acceptable for touch signal processing in the case that the signal phase is known, for example, when the transmitter waveform (e.g., the modulated driving signal) and the receiver waveform (e.g., the resulting signals) are synchronized in time.

However, in some cases, the signal phase may not be known. For example, in active pen data reception, pen position estimation, or interference (e.g., noise) measurements the signal phase may be unknown. In this case, single phase demodulation can result in varying output magnitude and inconsistent magnitude and phase measurements.

In addition, in some cases full spatial resolution may be desired, while in other cases only partial spatial resolution may be sufficient. For example, for touch sensing and/or or pen position estimation, full spatial can be used, while for active pen data reception partial spatial resolution may be desired.

Examples of the present disclosure provide techniques and apparatus for simultaneous demodulation of two orthogonal waveforms. Examples also provide for signal combining or time serial demodulation in order to keep the number of receivers the same as for single phase demodulation.

FIG. 1 is a block diagram of an exemplary input device 100, in accordance with examples of the disclosure. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing (e.g., an Active Matrix (e.g., a rectangular array) of Thin Film a-Si transistors for AMOLED and AMLCD, etc.). As another example, the display screen of the display 180 may be operated in part or in total by the processing system 110.

In various embodiments, the input device 100 may comprise one or more sensor electrodes configured for both display updating and input sensing. For example, at least one sensor electrodes that are used for input sensing may comprise one or more display electrodes of the display device that are used in updating the display. Further, the display electrode may comprise one or more of segments of a Vcom electrode (common electrodes), source drive lines (electrodes), gate line (electrodes), an anode sub-pixel electrode or cathode pixel electrode, or any other display element. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) Multi-domain Vertical Alignment (MVA), IPS and FFS), over an cathode layer (OLED), etc. In such embodiments, the display electrode can also be referred to as a "combination electrode", since it performs multiple functions. In various embodiments, each of the sensor electrodes comprises one or more display electrodes associated with a pixel or sub pixel. In other embodiments, at least two sensor electrodes may share at least one display electrode associated with a pixel or sub-pixel.

In various embodiments, a first sensor electrode comprises one or more display electrodes configured for display updating and capacitive sensing and a second sensor electrode may be configured for capacitive sensing and not for display updating. The second sensor electrode may be disposed between substrates of the display device or external from the display device. In some embodiments, all of the sensor electrodes may comprise one or more display electrodes configured for display updating and capacitive sensing.

Processing system 110 may be configured to perform input sensing and display updating during at least partially overlapping periods. For example, a processing system 110 may simultaneously drive a first display electrode for both display updating and input sensing. In another example, processing system 110 may simultaneously drive a first display electrode for display updating and a second display electrode for input sensing. In some embodiments, processing system 110 in configured to perform input sensing and display updating during non-overlapping periods. The non-overlapping periods may be referred to as non-display update periods. The non-display update periods may occur between display line update periods of common display frame and be at least as long as a display line update period. Further, the non-display update periods may occur between display line update periods of a common display frame and be one of longer than or shorter than a display line update period. In some embodiments, the non-display update periods may occur at the beginning of a display frame and/or between display frames. Processing system 110 may be configured to drive one or more of the sensor electrodes and/or the display electrodes with a shield signal. The shield signal may comprise one of a constant voltage signal or a varying voltage signal (guard signal). Further, one or more of the sensor electrodes and/or display electrodes may be electrically floated.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
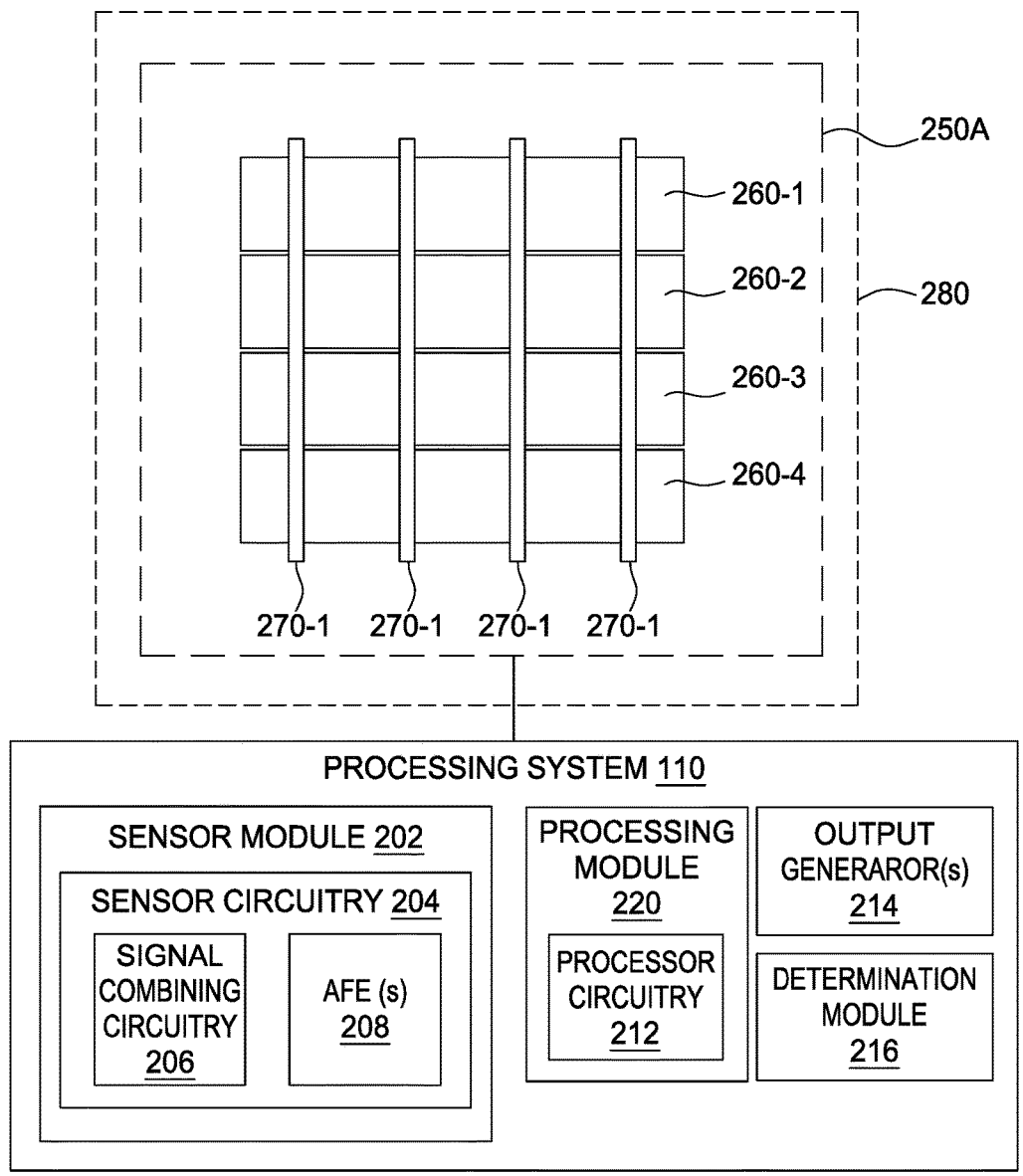
FIGS. 2A-2B illustrate portions of exemplary patterns of sensing elements.

FIG. 2A illustrates a portion of an exemplary pattern of sensing elements according to some embodiments. For clarity of illustration and description, FIG. 2A shows the sensing elements in a pattern of simple rectangles and does not show various components, such as various interconnects between the sensing elements and the processing system 110. An electrode pattern 250A comprises a first plurality of sensor electrodes 260 (260-1, 260-2, 260-3, . . . 260-*n*), and a second plurality of sensor electrodes 270 (270-1, 270-2, 270-3, . . . 270-*m*) disposed over the first plurality of sensor electrodes 260. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "receiver electrodes 270"). In another embodiment, one plurality of sensor electrodes may be configured to transmit and receive and the other plurality of sensor electrodes may also be configured to transmit and receive. In yet another embodiment, the processing system 110 receives resulting signals with one or more sensor electrodes of the first and/or second plurality of sensor electrodes while the one or more sensor electrodes are modulated with absolute capacitive sensing signals. The first plurality of sensor electrodes 260, the second plurality of sensor electrodes 270, or both can be disposed within the sensing region 120. The electrode pattern 250A can be coupled to the processing system 110.

The first plurality of sensor electrodes 260 and the second plurality of sensor electrodes 270 are typically ohmically isolated from each other. That is, one or more insulators separate the first plurality of sensor electrodes 260 and the second plurality of sensor electrodes 270 and prevent them from electrically shorting to each other. In some embodiments, the first plurality of sensor electrodes 260 and the second plurality of sensor electrodes 270 are separated by insulative material disposed between them at cross-over areas; in such constructions, the first plurality of sensor electrodes 260 and/or the second plurality of sensor electrodes 270 can be formed with jumpers connecting different portions of the same electrode. In some embodiments, the first plurality of sensor electrodes 260 and the second plurality of sensor electrodes 270 are separated by one or more layers of insulative material. In such embodiments, the first plurality of sensor electrodes 260 and the second plurality of sensor electrodes 270 can be disposed on separate layers of a common substrate. In some other embodiments, the first plurality of sensor electrodes 260 and the second plurality of sensor electrodes 270 are separated by one or more substrates; for example, the first plurality of sensor electrodes 260 and the second plurality of sensor electrodes 270 can be disposed on opposite sides of the same substrate, or on different substrates that are laminated together. In some embodiments, the first plurality of sensor electrodes 260 and the second plurality of sensor electrodes 270 can be disposed on the same side of a single substrate.

The areas of localized capacitive coupling between the first plurality of sensor electrodes 260 and the second plurality sensor electrodes 270 may be form "capacitive pixels" of a "capacitive image." The capacitive coupling between the first plurality of sensor electrodes 260 and the second plurality of sensor electrodes 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image." In some embodiments, the localized capacitive coupling between each of the first plurality of sensor electrodes 260 and the second plurality of sensor electrodes 270 and an input object may be termed "capacitive measurements" of "capacitive profiles."

The processing system 110 can include a sensor module 202 having sensor circuitry 204. The sensor circuitry 204 operates the electrode pattern 250A to receive resulting signals from sensor electrodes in the electrode pattern using a capacitive sensing signal having a sensing frequency. For example, the sensor circuitry 204 can include analog front end(s) (AFEs) 208 that receive the signals coupled onto the sensor electrodes. The signals may include desired signals, such as active pen data, or undesired signals, such as noise or interference. As will be described in greater detail below, the AFEs 208 perform single waveform demodulation, simultaneous multiple waveform in-phase quadrature (I/Q) demodulation, or time serial I/Q demodulation of the received signals. In this case, the processing system 110 may use orthogonal demodulation waveforms. As shown in FIG. 2A, the sensor circuitry 204 may include signal combining circuitry 206. According to certain examples, the signal combining circuitry 206 may be configured to perform signal blending and integration of resulting signals from the sensor electrodes for I/Q demodulation at the AFE(s) 208.

The processing system 110 can include a processing module 220 configured to determine signal magnitude measurements from the received signals. The processing module 220 can include processor circuitry 212, such as a digital signal processor (DSP), microprocessor, or the like. The processing module 220 can include software and/or firmware configured for execution by the processor circuitry 212 to implement the functions described herein. Alternatively, some or all of the functions of the processing module 220 can be implemented entirely in hardware (e.g., using integrated circuitry). The processing module 220 can track changes in capacitive measurements to detect input object(s) in the sensing region 120. The processing system 110 can include other modular configurations, and the functions performed by the sensor module 202 and the processing module 220 can, in general, be performed by one or more modules or circuits in the processing system 110. The processing system 110 can include other modules and circuits, and can perform other functions as described in some embodiments below. The processing system 110 can include output generator(s) 214 that couple modulated signals to the sensors electrodes. The processing system 110 can include a determination module 216. As will be described in more detail below, the determination module 216 may be configured to determine whether or not the signal combining circuitry 206 will perform signal combining and to determine whether the processing module 220 performs single waveform demodulation, in-phase quadrature (I/Q) demodulation, or time-serial I/Q demodulation. For example, the determinations may be based on whether the signal phase is known or unknown and whether full or partial spatial resolution is desired.

The processing system 110 can operate in absolute capacitive sensing mode or transcapacitive sensing mode. In absolute capacitive sensing mode, receiver(s) in the sensor circuitry 204 measure voltage, current, or charge on sensor electrode(s) in the electrode pattern 250A while the sensor electrode(s) are modulated with absolute capacitive sensing signals to generate the resulting signals. The processing module 220 generates absolute capacitive measurements from the resulting signals. The processing module 220 can track changes in absolute capacitive measurements to detect input object(s) in the sensing region 120.

In transcapacitive sensing mode, transmitter(s) in the sensor circuitry 204 drive one or more of the first plurality of sensor electrodes 260 with the capacitive sensing signal (also referred to as a transmitter signal or modulated signal in the transcapacitive sensing mode). Receiver(s) in the sensor circuitry 204 measure voltage, current, or charge on one or more of the second plurality of sensor electrodes 270 to generate the resulting signals. The resulting signals comprise the effects of the capacitive sensing signal and input object(s) in the sensing region 120. The processing module 220 generates transcapacitive measurements from the resulting signals. The processing module 220 can track changes in transcapacitive measurements to detect input object(s) in the sensing region 120.

In some embodiments, the processing system 110 "scans" the electrode pattern 250A to determine capacitive measurements. In the transcapacitive sensing mode, the processing system 110 can drive the first plurality of sensor electrodes 260 to transmit transmitter signal(s). The processing system 110 can operate the first plurality of sensor electrodes 260 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of sensor electrodes 270 to be independently determined. In the absolute capacitive sensing mode, the processing system 110 can receive resulting signals from one sensor electrode 260, 270 at a time, or from a plurality of sensor electrodes 260, 270 at a time. In either mode, the processing system 110 can operate the second plurality of sensor electrodes 270 singly or collectively to acquire resulting signals. In absolute capacitive sensing mode, the processing system 110 can concurrently drive all electrodes along one or more axes. In some examples, the processing system 110 can drive electrodes along one axis (e.g., along the first plurality of sensor electrodes 260) while electrodes along another axis are driven with a shield signal, guard signal, or the like. In some examples, some electrodes along one axis and some electrodes along the other axis can be driven concurrently.

In the transcapacitive sensing mode, the processing system 110 can use the resulting signals to determine capacitive measurements at the capacitive pixels. A set of measurements from the capacitive pixels form a "capacitive image" (also "capacitive frame") representative of the capacitive measurements at the pixels. The processing system 110 can acquire multiple capacitive images over multiple time periods, and can determine differences between capacitive images to derive information about input in the sensing region 120. For example, the processing system 110 can use successive capacitive images acquired over successive periods of time to track the motion(s) of one or more input objects entering, exiting, and within the sensing region 120.

In absolute capacitive sensing mode, the processing system 110 can use the resulting signals to determine capacitive measurements along an axis of the sensor electrodes 260 and/or an axis of the sensor electrodes 270. A set of such measurements forms a "capacitive profile" representative of the capacitive measurements along the axis. The processing system 110 can acquire multiple capacitive profiles along one or both of the axes over multiple time periods and can determine differences between capacitive profiles to derive information about input in the sensing region 120. For example, the processing system 110 can use successive capacitive profiles acquired over successive periods of time to track location or proximity of input objects within the sensing region 120. In other embodiments, each sensor can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the processing system 110 can estimate the baseline capacitance in various ways. For example, in some embodiments, the processing system 110 takes "baseline images" or "baseline profiles" when no input object is determined to be in the sensing region 120, and uses those baseline images or baseline profiles as estimates of baseline capacitances. The processing module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display device 280 used in updating a display of a display screen, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The display electrodes can also be referred to as "combination electrodes," since the display electrodes perform functions of display updating and capacitive sensing. In various embodiments, each sensor electrode of the first and second plurality of sensor electrodes 260 and 270 comprises one or more combination electrodes. In other embodiments, at least two sensor electrodes of the first plurality of sensor electrodes 260 or at least two sensor electrodes of the second plurality of sensor electrodes 270 may share at least one combination electrode. Furthermore, in one embodiment, both the first plurality of sensor electrodes 260 and the second plurality sensor electrodes 270 are disposed within a display stack on the display screen substrate. Additionally, at least one of the sensor electrodes 260, 270 in the display stack may comprise a combination electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass).

In an embodiment, the processing system 110 comprises a single integrated controller, such as an application specific integrated circuit (ASIC), having the sensor module 22, the processing module 220, and any other module(s) and/or circuit(s). In another embodiment, the processing system 110 can include a plurality of integrated circuits, where the sensor module 202, the processing module 220, and any other module(s) and/or circuit(s) can be divided among the integrated circuits. For example, the sensor module 202 can be on one integrated circuit, and the processing module 220 and any other module(s) and/circuit(s) can be one or more other integrated circuits. In some embodiments, a first portion of the sensor module 202 can be on one integrated circuit and a second portion of the sensor module 202 can be on second integrated circuit. In such embodiments, at least one of the first and second integrated circuits comprises at least portions of other modules such as a display driver module and/or a display driver module.

Figure 2B:
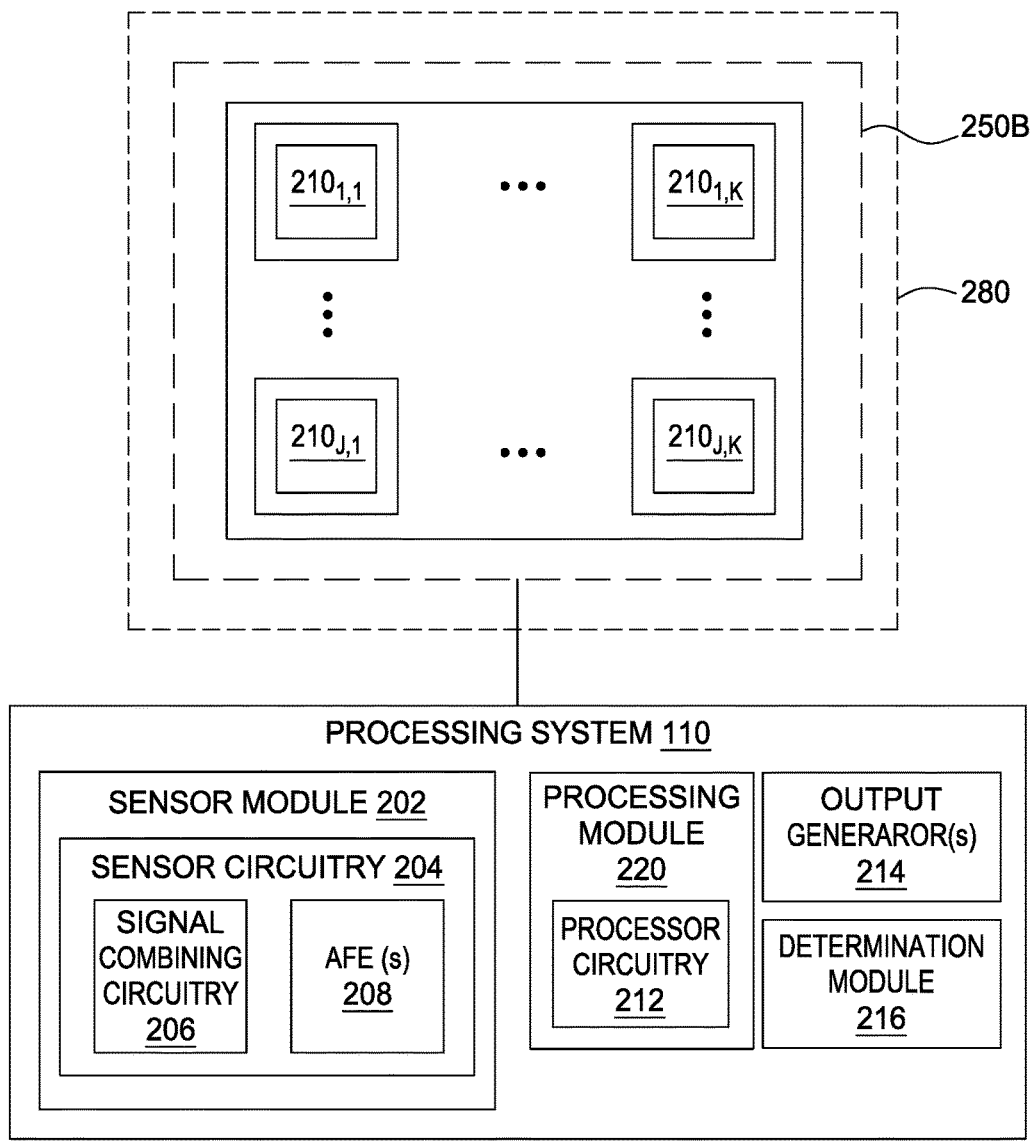

FIG. 2B illustrates a portion of another exemplary pattern of sensing elements according to some embodiments. For clarity of illustration and description, FIG. 2B presents the sensing elements in a matrix of rectangles and does not show various components, such as various interconnects between the processing system 110 and the sensing elements. An electrode pattern 250B comprises a plurality of sensor electrodes 210 disposed in a rectangular matrix (e.g., a rectangular array). The electrode pattern 250B comprises sensor electrodes $210_{J,K}$ (referred to collectively as sensor electrodes 210) arranged in J rows and K columns, where J and K are positive integers, although one of J and K may be zero. It is contemplated that the electrode pattern 250B may comprise other patterns of the sensor electrodes 210, such as polar arrays, repeating patterns, non-repeating patterns, non-uniform arrays, a single row or column, or other suitable arrangement. Further, the sensor electrodes 210 may be any shape, such as circular, rectangular, diamond, star, square, nonconvex, convex, nonconcave, concave, etc. Further, the sensor electrodes 210 may be sub-divided into a plurality of distinct sub-electrodes. The electrode pattern 250 is coupled to the processing system 110.

The sensor electrodes 210 are typically ohmically isolated from one another. Additionally, where a sensor electrode 210 includes multiple sub-electrodes, the sub-electrodes may be ohmically isolated from each other. Furthermore, in one embodiment, the sensor electrodes 210 may be ohmically isolated from a grid electrode 218 that is between the sensor electrodes 210. In one example, the grid electrode 218 may surround one or more of the sensor electrodes 210, which are disposed in windows 216 of the grid electrode 218. In some embodiments, the electrode pattern 250B can include more than one grid electrode 218. In some embodiments, the grid electrode 218 can have one or more segments. The grid electrode 218 may be used as a shield or to carry a guarding signal for use when performing capacitive sensing with the sensor electrodes 210. Alternatively or additionally, the grid electrode 218 may be used as sensor electrode when performing capacitive sensing. Furthermore, the grid electrode 218 may be co-planar with the sensor electrodes 210, but this is not a requirement. For instance, the grid electrode 218 may be located on a different substrate or on a different side of the same substrate as the sensor electrodes 210. The grid electrode 218 is optional and in some embodiments, the grid electrode 218 is not present.

In a first mode of operation, the processing system 110 can use at least one sensor electrode 210 to detect the presence of an input object via absolute capacitive sensing. The sensor circuitry 204 can measure voltage, charge, or current on sensor electrode(s) 210 to obtain resulting signals indicative of a capacitance between the sensor electrode(s) 210 and an input object. The processing module 220 uses the resulting signals to determine absolute capacitive measurements. When the electrode pattern 250B, the absolute capacitive measurements can be used to form capacitive images.

In a second mode of operation, the processing system 110 can use groups of the sensor electrodes 210 to detect presence of an input object via transcapacitive sensing. The sensor circuitry 204 can drive at least one of the sensor electrodes 210 with a transmitter signal, and can receive a resulting signal from at least one other of the sensor electrodes 210. In some examples, as described in greater detail below, the sensor circuitry 204 may drive the sensor electrodes 210 with orthogonal signals for I/Q demodulation. The processing module 220 uses the resulting signals to determine transcapacitive measurements and form capacitive images.

The input device 100 may be configured to operate in any one of the modes described above. The input device 100 may also be configured to switch between any two or more of the modes described above. The processing system 110 can be configured as described above with respect to FIG. 2A.

As described above, the input device 100 may be configured for touch sensing. The touch sensing may be performed by the sensor circuitry 204 driving one or more of the sensor electrodes 210 of the input device 100 with a modulating signal and receiving resulting signals having effects indicating changes in capacitance of the sensor electrodes. The processing module 220 can determine the position of the input object 140 based on the measured changes in capacitance. Typically, touch controllers, for example AFE(s) 208 of sensor circuitry 204, demodulate the signal(s) from the sensor electrodes 210 using single phase demodulation. Single phase demodulation may be acceptable for touch signal processing because the signal phase is known since the transmitter waveform (e.g., the modulated driving signal) and the receiver waveform (e.g., the resulting signals) are synchronized in time. Further, touch signal processing may use full spatial resolution. Therefore, signal combining may not be used for touch signal processing.

Figure 3:
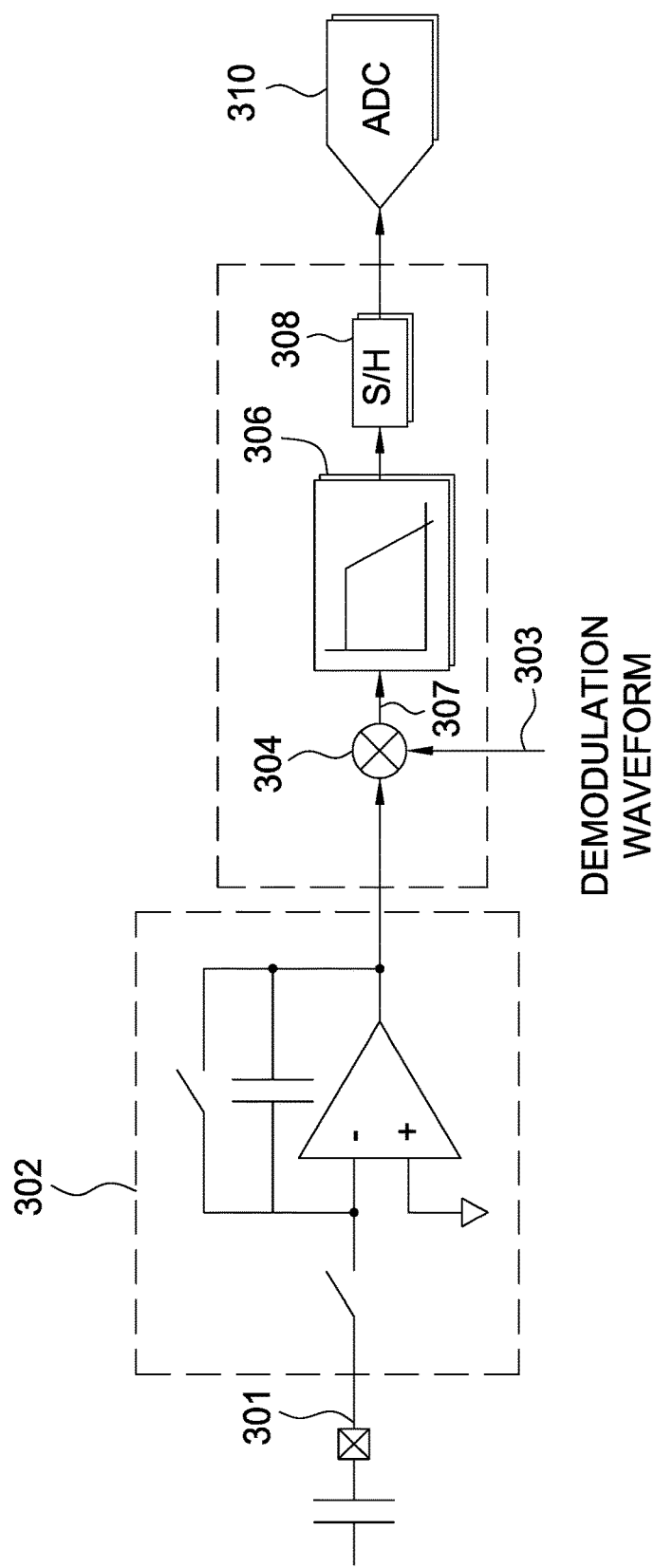
FIG. 3 is a block diagram depicting an exemplary signal path with single phase demodulation.

FIG. 3 is a block diagram depicting an exemplary signal path of a receiver with single phase demodulation. The signal path shown in FIG. 3 may be implemented in the AFE(s) 208 of the processing system 110. As shown in FIG. 3, the signal 301 (e.g., a resulting signal received from a sensor electrode 210 or 270) may pass through a charge integrator 302. The charge integrator 302 may output the charge accumulated from the resulting signal 301 over time. The signal 301 may be input to a demodulation block 304 and demodulated down from its carrier frequency using a single signal demodulation waveform 303. The demodulation block 304 may provide an output waveform 307 to a low pass filter 306 and a sample and hold (S/H) circuit 308. The signal may then be processed by an analog-to-digital converter (ADC) 310.

When used for touch sensing, the sampling (e.g., at the S/H circuit 308) and demodulation timing may be aligned with known transmitter timing (e.g., the timing of the modulating signals used by the sensor circuitry 204 to drive the sensor electrodes 210 or 260 for touch sensing). This timing alignment may allow consistent measurement of incoming signal (e.g., the resulting signals) magnitude.

However, in some cases, the signal phase may not be known. For example, in active pen data reception or interference measurements the signal phase may be unknown. The measurement output magnitude varies depending on relative phase of the incoming signal and the sampling and demodulation timing at the receiver (e.g., the AFE(s) 208). In this case, single phase demodulation can result in varying output magnitude and inconsistent magnitude and phase measurements, for example, as illustrated in FIG. 4.

Figure 4:
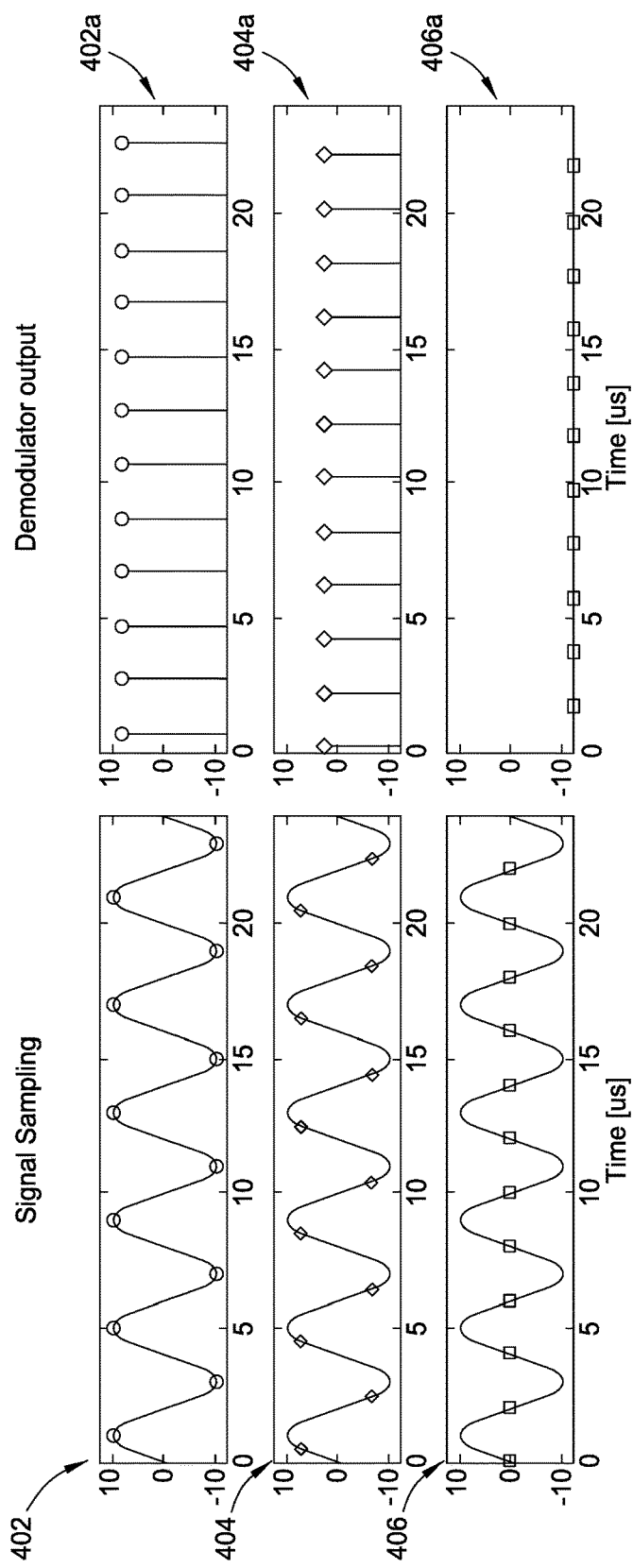
FIG. 4 illustrates three exemplary graphs depicting signal sampling and corresponding demodulator outputs with single phase demodulation of a signal with unknown phase.

FIG. 4 illustrates three exemplary graphs depicting signal sampling and corresponding demodulator outputs with single phase demodulation of a signal with unknown phase. As shown in FIG. 4, as shown in the graph 402, in an extreme case, the signal sampling and demodulation may align with the signal and produce a consistent demodulator output magnitude, as shown in graph 402a, consistent with the case known phase. However, as shown in graph 406, in another extreme case, the sampling may occur at signal zero crossings (i.e., completely not aligned) to produce a zero measurement at the demodulator output, as shown in graph 406a. In other cases, as shown in graph 404, the signal and the sampling and demodulation may be misaligned and cause a varying demodulator output magnitude, as shown in graph 404a. Such variation in magnitude is undesirable as it leads to unreliable signal detection.

In one approach, magnitude variation for single phase demodulation can be mitigated by demodulating to a beat frequency. However, that approach may require a longer time to capture all phases of the beat frequency, more complicated frequency planning, higher ADS sampling frequency, and more processing in digital ASIC and/or firmware.

According to certain examples, simultaneous in-phase quadrature (I/Q) demodulation can be performed using two demodulation waveforms with ninety degree offset (e.g., orthogonal) in phase (e.g., corresponding to a quarter of the period in time) from another, for example, to mitigate magnitude variation in the case of signals with unknown phase (e.g., active pen data reception and/or pen position estimation). The demodulation results in an in-phase (I) measurement component and a quadrature (Q) measurement component.

Figure 5:
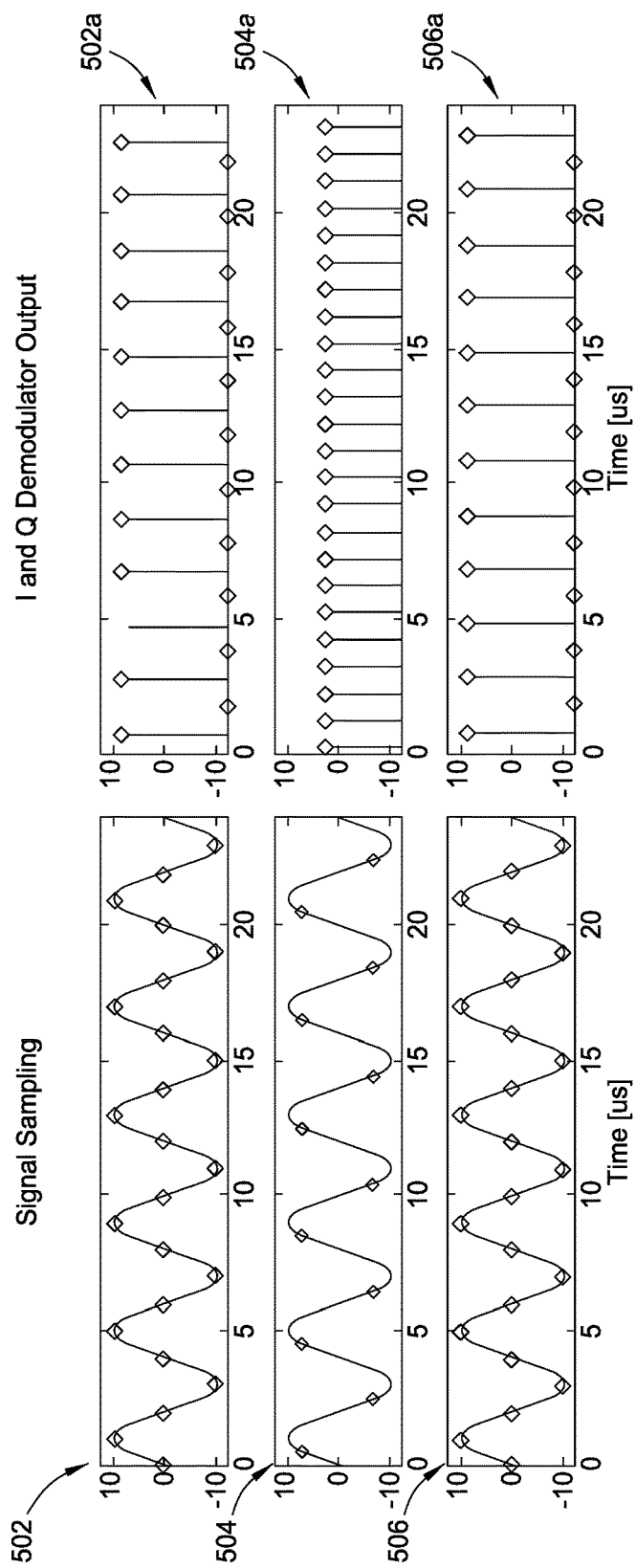
FIG. 5 illustrates three exemplary graphs depicting signal sampling and corresponding demodulator outputs with I/Q demodulation of a signal.

Unlike single phase demodulation, combining the I and Q components results in consistent magnitude (and phase) measurement regardless of the phase of the incoming signal and, therefore, regardless whether the phase of the incoming signal is known as shown in FIG. 5. The incoming signal magnitude gets distributed between two components regardless of the signal phase. As shown in FIG. 5, regardless of phase of the alignment in the phase of the incoming signal and the sampling, shown in graphs 502, 504, 506, the I and Q demodulator output measurements are always consistent in magnitude, as shown in graphs 502a, 504a, 506a.

Figure 6:
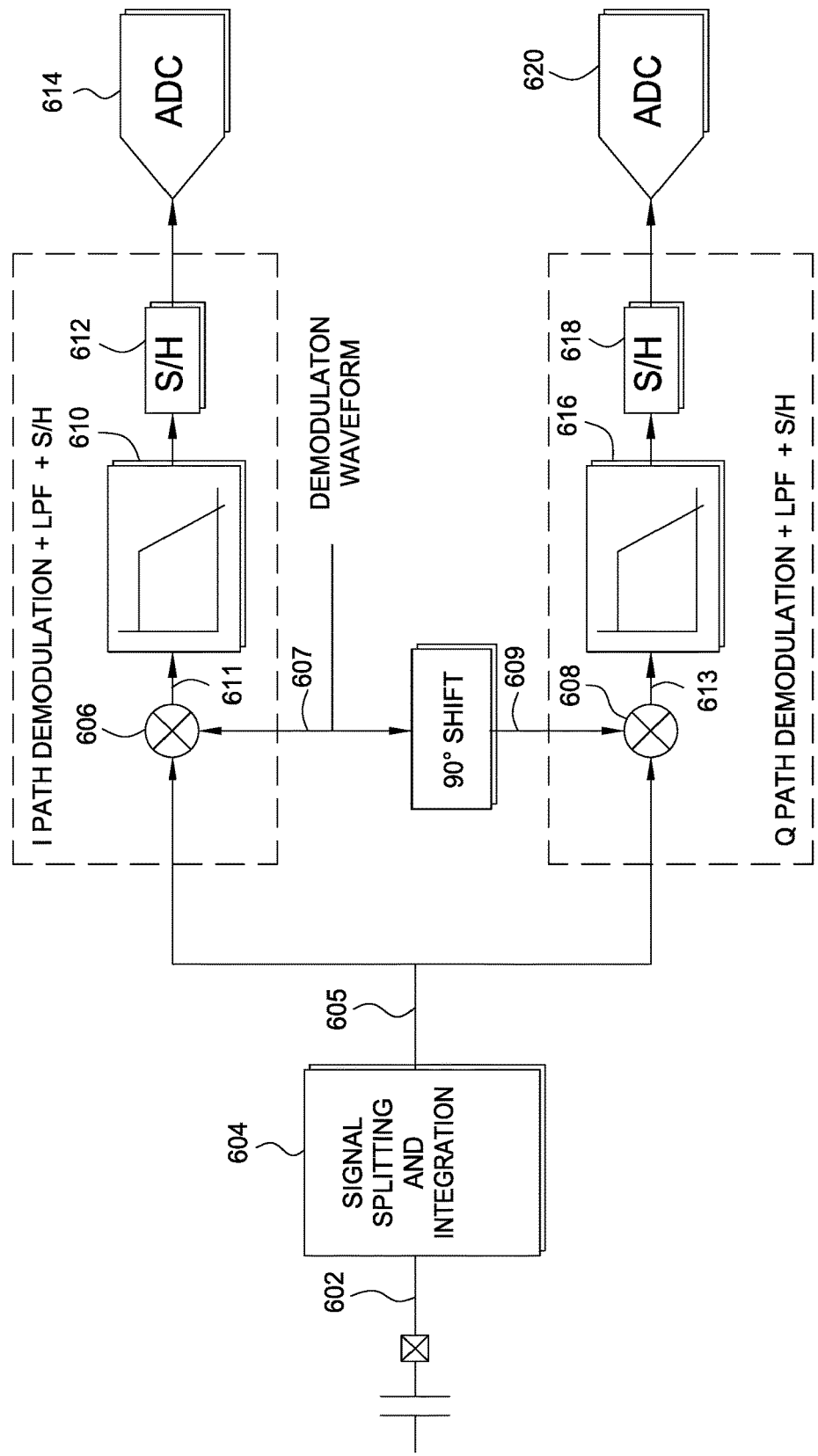
FIG. 6 is a block diagram depicting a signal path with in-phase quadrature (I/Q) demodulation.

While I/Q demodulation provides benefits in terms of magnitude variation mitigation, the I/Q demodulation may increase complexity since two demodulation waveforms and two signal paths are used. FIG. 6 is a block diagram depicting an example signal path with simultaneous I/Q demodulation, according to examples described herein. As shown in FIG. 6, the signal 602 is split by the signal splitting and integration module 604 to output a signal 605. The signal 602 may be a desired signal, such as an active data pen signal, or an undesired signal, such as noise or interference. The signal 605 is input to the demodulation blocks 606 and 608 and then demodulated by the two demodulation waveforms 607 and 609. The demodulation waveforms 607 and 609 are offset by ninety degrees. The demodulation block 606 outputs an output waveform 611 which may correspond to an in-phase component of the signal 605. The demodulation block 608 outputs an output waveform 613 which may correspond to a quadrature component of the signal 605. The output waveform 611 passes through the low pass filter 610 and sample and hold circuit 612 to the ADC 614. Similarly, the output waveform 613 passes through the low pass filter 616 and sample and hold circuit 618 to the ADC 620. Thus, each component (I and Q) uses a separate signal path and a pair of receivers for processing of a single incoming signal 602. For full spatial resolution, the signal from each sensor electrode may be fed to a pair of receivers, thus, doubling the number of receivers. Active pen position estimation is one example application where full spatial resolution may be desired.

Example Touch Controller with Signal Combining for I/Q Demodulation Using Two Orthogonal Waveforms According to certain examples, to keep the number of receivers the same as for single phase demodulation, the signal from two sensor electrodes can be combined and then fed to a pair of receivers that perform I/Q demodulation using the two demodulation waveforms. For example, the signal combining circuitry 206 can combine the signals from two of the sensor electrodes 210 or 270, and the combined signal can be divided into two demodulation waveforms and simultaneously demodulated by a pair of the AFE(s) 208 using I/Q demodulation.

Figure 7:
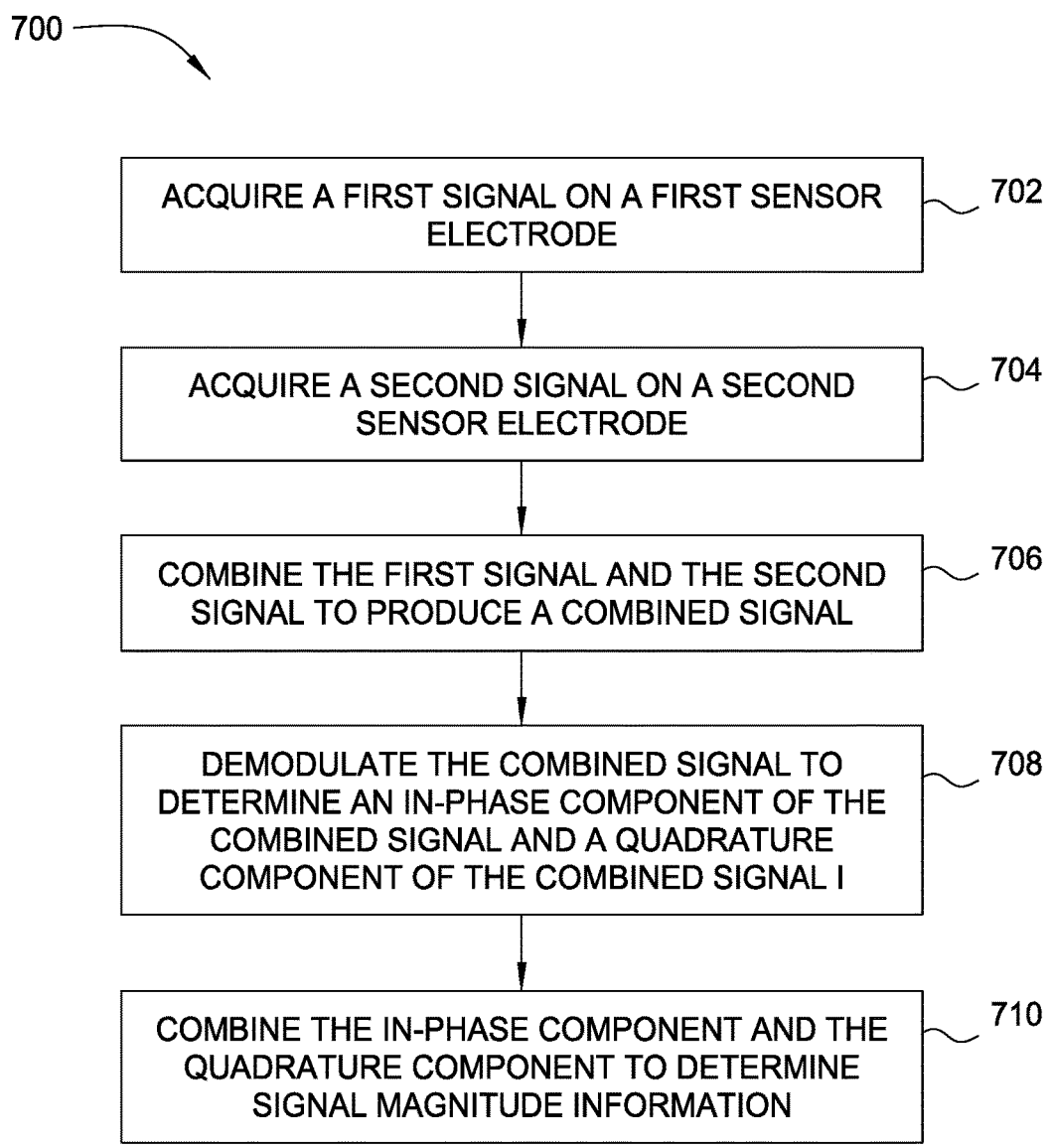
FIG. 7 is a flow diagram illustrating example operations for touch sensing using signal combining for simultaneous I/Q demodulation.

FIG. 7 is a flow diagram illustrating example operations 700 for capacitively coupled signal sensing (e.g., detection/measurement) using signal combining for simultaneous I/Q demodulation using two orthogonal waveforms, according to examples described herein. The operations 700 can be performed by the processing system 110 described above to determine signal magnitude information The operations 700 begin at step 702, where the processing system 110 acquires a first signal capacitively coupled onto a first sensor electrode of the input device. At step 704, the processing system 110 acquires a second signal capacitively coupled onto a second sensor electrode At step 706, the processing system 110 combines the first signal and the second signal to produce a combined signal. According to certain examples, the processing system 110 may combine at least a third resulting signal from a third sensor electrode with the first resulting signal and the second resulting signal to produce the combined signal. According to certain examples, the processing system 110 may dynamically determine whether to use signal combining based on the desired spatial resolution (e.g., partial or full spatial resolution) and whether the phase is known. In aspects, for active pen data reception, only partial resolution may be desired, and the signaling combining may be used, while for pen position estimation and/or touch sensing, full resolution may be desired and signal combining may not be used.

At step 708, the processing system 110 demodulates (e.g., using two receiver circuits) the combined signal to determine a first component (e.g., an in-phase component) of the combined signal and a second component (e.g., a quadrature component) of the combined signal. According to certain examples, the processing system 110 may dynamically determine whether to use I/Q demodulation or single waveform demodulation, for example, based on a desired spatial resolution (e.g., full or partial) and/or whether the phase is known or unknown. In aspects, for active pen data reception and active pen position estimation, the phase may be unknown, and the I/Q demodulation may be used. For active pen data reception, where partial spatial resolution may be used, signaling combining and simultaneous I/Q demodulation may be used. For pen position estimation, full spatial resolution may be desired, thus, signal combining may not be used and the number of receivers may be doubled or time-serial I/Q demodulation may be used as described in more detail below.

At step 710, the processing system 110 combines the in-phase and quadrature components to determine signal magnitude information.

Figure 8:
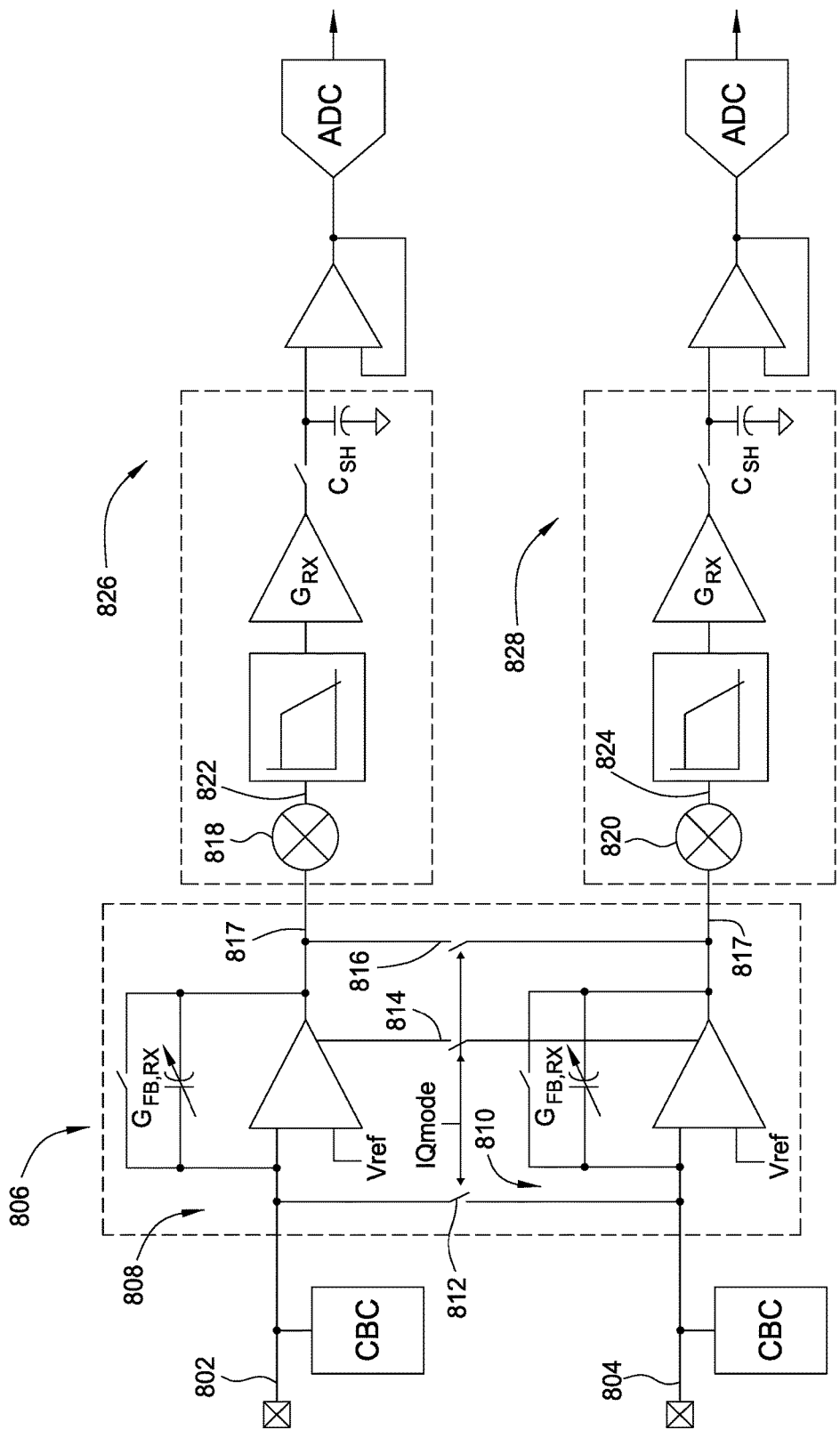
FIG. 8 is a block diagram depicting an example signal path with two sensor electrode signals combining and I/Q demodulation.

FIG. 8 is a block diagram depicting an example signal path with two sensor electrode signal combining and I/Q demodulation, according to examples described herein. As shown in FIG. 8, a first signal 802 from a first sensor electrode (e.g., one of sensor electrodes 210 or 270) and a second signal 804 from a second sensor electrode (e.g., another one of sensor electrodes 210 or 270) can be optionally combined at the signal blending and integration circuitry 806. According to certain examples, the signal blending may be before, after, or during charge integration. The signal blending and integration circuitry 806 may include a pair of charge-sharing charge integrators (CS-CI) 808 and 810.

Signal blending may be achieved by charge-sharing (e.g., shorting) the two charge integrators together. For example, the switches 812, 814, and 816 can be used to achieve the signal blending. Switch 812 may be located at the input of the charge integrators 808 and 810 and switch 816 may be located at the output of the charge integrators 808 and 810. Additionally, switch 814 within the two charge integrators 808 and 810 may also be shorted for the signal blending. For simultaneous I/Q demodulation mode, the switches 812, 814, and 816 may be closed and the two charge integrators 808 and 810 may function, essentially, as a single charge integrator and collect the total incoming charge from the two input pins (e.g., from both signals 802 and 804). The output of the charge-sharing charge integrators 808 and 810 may be identical (e.g., due to output shorting), and may be proportional to the total input charge collected over the two sensor electrodes (e.g., from the signals 802 and 804). The output is a combined signal 817.

The combined signal 817 may then be fed into demodulation blocks 818 and 820. For simultaneous I/Q demodulation, the combined signal 817 is demodulated at the demodulation block 818 using a first demodulation waveform and the combined signal 817 is demodulated at the demodulation block 820 using a second demodulation waveform that is orthogonal to the first demodulation waveform. For example, the timing waveforms controlling demodulation blocks 818 and 820 can be delayed by precisely one-quarter of a sense cycle (i.e., ninety degree phase shift). The demodulation block 818 outputs an output waveform 822 which may correspond to an in-phase component of the combined signal 817. The demodulation block 828 outputs an output waveform 824 which may correspond to a quadrature component of the combined signal 817. The demodulation waveforms 818 and 820 may then be processed by the two receiver paths 826 and 828, similar to as described above in FIG. 6 for I/Q demodulation. Thus, as shown by FIG. 8, using the signal blending and integration and I/Q demodulation, the same number (i.e., two) of receivers can be used for processing signals from two sensor electrodes as is used for processing signals from two sensor electrodes using single waveform demodulation.

As mentioned above, simultaneous I/Q demodulation using two orthogonal waveforms may be used in cases where the signal phase is unknown. Signal combining can be used to reduce the number of receiver paths in cases where full spatial resolution is not needed (e.g., active pen data reception). In other cases (e.g., for pen position estimation or touch position estimation), it may be desirable to perform single phase demodulation without signal combining (e.g., to save power/reduce processing overhead when full spatial resolution is needed or when the signal phase is known). Thus, according to certain examples, the processing system 110 may dynamically switch between a simultaneous I/Q demodulation mode and a single waveform demodulation mode and between a signal combining mode and a mode without signal combining. The switches 812, 814, and 816 may be closed for the simultaneous I/Q demodulation mode and may be left open for the single waveform demodulation mode (e.g., a legacy mode of operation). In the single waveform demodulation mode both channels may be operated with identical timing waveforms.

In one example, the input device 100 could be operating using an active pen as the input object 140. When the pen is transmitting data packets, the processing system 110 may process signals from pairs of sensor electrodes 210 or 270 with half spatial resolution and use those signals to detect the transmitted sequence. Thus, the switches 812, 814, and 816 may be closed for simultaneous I/Q demodulation with signal combining. When the pen position estimation is being performed, the switches 812, 814, and 816 may be opened and the processing system 110 may process signals using single phase demodulation and time serial I/Q demodulation described below, for full spatial resolution.

According to certain examples, the signal processing described above may be performed in the analog domain before ADC. Alternatively, although not shown in the figures, the charge integrator output could be converted to the digital domain using faster ADC, and I/Q demodulation and filtering can be implemented in the digital domain.

According to certain examples, although combining and processing of two signals is desired above, in general, signals from more than two sensor electrodes can be combined thus reducing the number of receiver pairs needed for processing.

Example Time Serial in-Phase Quadrature Demodulation Using a Single Waveform

According to certain examples, time serial I/Q demodulation of a single waveform can be performed, for example, when the phase of the resulting signal is unknown, to obtain a consistent magnitude.

In some cases, a signal may persist for enough time to perform two measurements. In this case, the magnitude variation can be mitigated by precisely timing two measurement bursts such that the periodic incoming signal phase is offset by 90 degrees between the two measurements. Combining the results of two measurements results in consistent magnitude measurement independent of the unknown signal phase.

One of these applications is active pen position measurement where carrier signal magnitude (i.e., power) is measured on all sensor electrodes (i.e., for full spatial resolution) to determine the location of the pen. To achieve consistent magnitude measurement independent of unknown signal phase, two measurement bursts are configured (e.g., by the sensor circuitry 204) and timed such that signal phase is offset by 90° between the two measurements. This is referred to as time-serial I/Q demodulation. For a periodic signal of interest, this is equivalent to parallel I/Q demodulation using two separate receiver chains.

Figure 9:
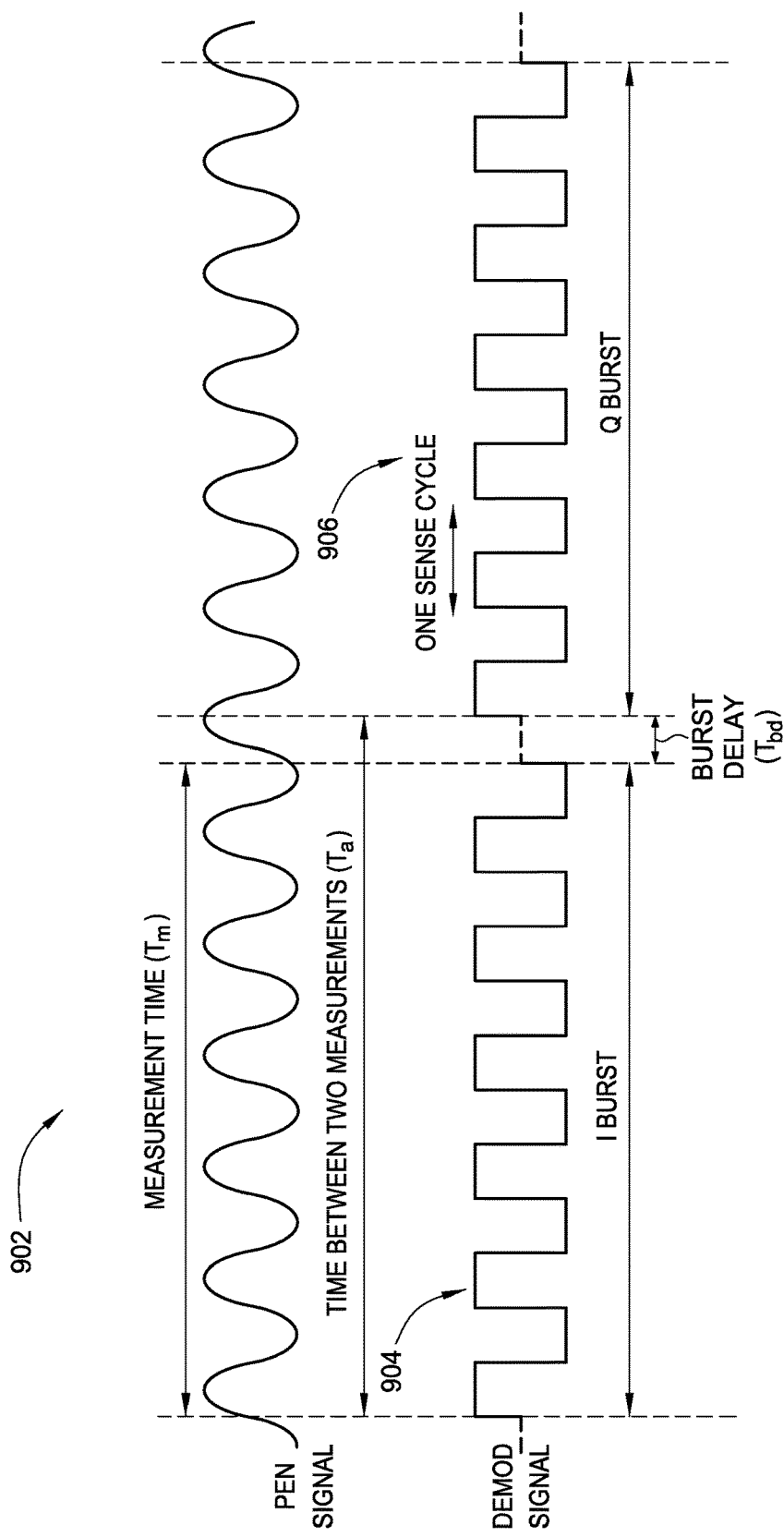
FIG. 9 is a timing diagram depicting example timing of in-phase and quadrature measurement bursts for time serial I/Q demodulation.

FIG. 9 is a timing diagram depicting example timing of in-phase and quadrature measurement bursts for time serial I/Q demodulation, according to examples described herein. As shown in FIG. 9, the signal 902 (e.g., an active pen position signal) can be measured in a first measurement burst 904 to determine the in-phase component and a second measurement burst 906 to determine the quadrature component, using a burst delay to generate 90° signal phase offset between the two measurement bursts.

Each burst consists of $N_{cpb}$ sense cycles and lasts for $T_m = N_{cpb}/f_{sense}$ seconds. The time between two measurements $(T_a)$ may be chosen such that the incoming signal phase at the beginning of the Q burst is 90° offset from the incoming signal phase at the beginning of the I burst. For example, the burst delay $(T_{bd})$ can be selected to achieve the signal phase offset. The burst delay may be selected using the following equations:

$$T_m = \frac{N_{cpb}}{f_{sense}} \quad \text{(Eq. 1)}$$

$$T_a = \frac{(\text{ceiling}(T_m f_c - 0.25) + 0.25)}{f_c} \quad \text{(Eq. 2)}$$

$$T_{bf} = (T_a - T_m) \quad \text{(Eq. 3)}$$

where, $N_{cpb}$ is the number of sense cycles per burst, $f_{sense}$ is the sensing frequency, and $f_c$ is the incoming signal (carrier) frequency.

The I and Q measurements can be combined to find the signal magnitude, M, for example, by finding the square root of the sum of squares according to:

$$(M=\sqrt{I^2+Q^2}) \quad \text{(Eq. 4)}$$

This technique for time serial I/Q demodulation can be employed to estimate the magnitude of an incoming signal with known frequency and unknown phase. While active pen is one type of signal, this scheme can also be used to detect narrowband noise at a known frequency, or other incoming signals of as-of-yet unknown origins As compared to the techniques described above for signal combining and simultaneous I/Q demodulation of two waveforms, the techniques for time serial I/Q demodulation may use twice the time, but may use only half the number of receivers.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A processing system for an input device, comprising:
    sensor circuitry configured to:
        acquire a first signal via a first sensor electrode of the input device; and
        acquire a second signal via a second sensor electrode of the input device;
    signal combining circuitry configured to:
        accumulate charge from the first signal and the second signal to produce a combined signal, wherein the combined signal is based on a combination of the charge accumulated from the first signal and the charge accumulated from the second signal;
    a first demodulator configured to determine an in-phase component of the combined signal based on the combined charge accumulated from the first and second signals;
    a second demodulator configured to determine a quadrature component of the combined signal based on the combined charge accumulated from the first and second signals;
    processing circuitry; and
    memory storing instructions that, when executed by the processing circuitry, cause the processing system to:
        combine the in-phase component and the quadrature component to determine signal magnitude information; and
        detect a presence of an input object based at least in part on the signal magnitude information.

2. The processing system of claim 1, wherein the processing module is configured to:
    split the combined signal into a first input signal and an identical second input signal;
    demodulate the first input signal using a first demodulation waveform having a first frequency or phase; and
    demodulate the second input signal using a second demodulation waveform having a second frequency or phase that is orthogonal to the first frequency or phase.

3. The processing system of claim 1, wherein the sensor circuitry is configured to:
    split the combined signal into a first input signal and an identical second input signal;
    demodulate the first input signal using a first demodulation waveform having a first carrier signal modulated based on a first digital code; and
    demodulate the second input signal using a second demodulation waveform having a second carrier signal modulated based on a second digital code that is orthogonal to the first digital code.

4. The processing system of claim 1, wherein the first signal and the second signal comprise one of desired signals from an input object or noise.

5. The processing system of claim 1, wherein the processing module comprises:
    a first receiver circuit configured to determine the in-phase component of the combined signal; and
    a second receiver circuit configured to determine the quadrature component of the combined signal.

6. The processing system of claim 1, further comprising a determination module configured to:
    determine to perform signal combining based on whether partial or full spatial resolution is desired and based on whether signal phase is known or unknown; and
    determine to perform single waveform demodulation, simultaneous in-phase quadrature (I/Q) demodulation, or time serial I/Q demodulation, based on whether partial or full spatial resolution is desired and based on whether the signal phase is known or unknown.

7. The processing system of claim 1, wherein:
    the sensor circuitry is further configured to acquire at least a third signal on a third sensor electrode; and
    the signal combining circuitry is further configured to combine the third signal with the first signal and the second signal to produce the combined signal.

8. An input device, comprising:
    an input surface;
    a first sensor electrode configured to acquire a first signal via the input surface;
    a second sensor electrode configured to acquire a second signal via the input surface;
    a plurality of charge integrators configured to accumulate charge from the first signal and the second signal to produce a combined signal, wherein the combined signal is based on a combination of the charge accumulated from the first signal and the charge accumulated from the second signal;
    a first demodulator configured to determine an in-phase component of the combined signal based on the combined charge accumulated from the first and second signals;
    a second demodulator configured to determine a quadrature component of the combined signal based on the combined charge accumulated from the first and second signals; and
    a processing system coupled to the first demodulator and the second demodulator, the processing system configured to:
        combine the in-phase component and the quadrature component to determine signal magnitude information; and
        detect a presence of an input object based at least in part on the signal magnitude information.

9. The input device of claim 8, wherein the processing system is configured to:

split the combined signal into a first input signal and an identical second input signal;
demodulate the first input signal using a first demodulation waveform having a first frequency or phase; and
demodulate the second input signal using a second demodulation waveform having a second frequency or phase that is orthogonal to the first frequency or phase.

10. The input device of claim 8, wherein the first signal and the second signal comprise desired signals from an input object or noise.

11. The input device of claim 8, wherein the processing system comprises:
a first receiver circuit configured to determine the in-phase component of the combined signal; and
a second receiver circuit configured to determine the quadrature component of the combined signal.

12. The input device of claim 8, wherein the processing system is further configured to:
determine to perform signal combining based on whether partial or full spatial resolution is desired and based on whether signal phase is known or unknown; and
determine to perform single waveform demodulation, simultaneous in-phase quadrature (I/Q) demodulation, or time serial I/Q demodulation, based on whether partial or full spatial resolution is desired and based on whether the signal phase is known or unknown.

13. A method of operating an input device, comprising:
acquiring a first signal via a first sensor electrode of the input device;
acquiring a second signal via a second sensor electrode of the input device;
accumulating charge from the first signal and the second signal to produce a combined signal, wherein the combined signal is based on a combination of the charge accumulated from the first signal and the charge accumulated from the second signal;
demodulating the combined signal, via a first demodulator, to determine an in-phase component of the combined signal based on the combined charge accumulated from the first and second signals;
demodulating the combined signal, via a second demodulator, to determine a quadrature component of the combined signal based on the combined charge accumulated from the first and second signals;
combining the in-phase component and the quadrature component to determine signal magnitude information; and
detecting a presence of an input object based at least in part on the signal magnitude information.

14. The method of claim 13, further comprising:
splitting the combined signal into a first input signal and an identical second input signal;
demodulating the first input signal using a first demodulation waveform having a first frequency or phase; and
demodulating the second input signal using a second demodulation waveform having a second frequency or phase that is orthogonal to the first frequency or phase.

15. The method of claim 13, further comprising:
splitting the combined signal into a first input signal and an identical second input signal;
demodulating the first input signal using a first demodulation waveform having a first carrier signal modulated based on a first digital code; and
demodulating the second input signal using a second demodulation waveform having a second carrier signal modulated based on a second digital code that is orthogonal to the first digital code.

16. The method of claim 13, wherein the first signal and the second signal comprise desired signals from an input object or noise.

17. The method of claim 13, wherein
demodulating the combined signal, via the first demodulator, comprises using a first receiver circuit to determine the in-phase component of the combined signal; and wherein
demodulating the combined signal, via the second demodulator, comprises using a second receiver circuit to determine the quadrature component of the combined signal.

18. The method of claim 13, further comprising:
determining to perform signal combining based on whether partial or full spatial resolution is desired and based on whether signal phase is known or unknown; and
determining to perform single waveform demodulation, simultaneous in-phase quadrature (I/Q) demodulation, or time-serial I/Q demodulation, based on whether partial or full spatial resolution is desired and based on whether the signal phase is known or unknown.

19. The method of claim 13, further comprising:
acquiring at least a third signal on a third sensor electrode; and
combining the third signal with the first signal and the second signal to produce the combined signal.

* * * * *